March 16, 1926.                     1,576,692
J. B. VIDACH
SPRING
Original Filed Sept. 26, 1923
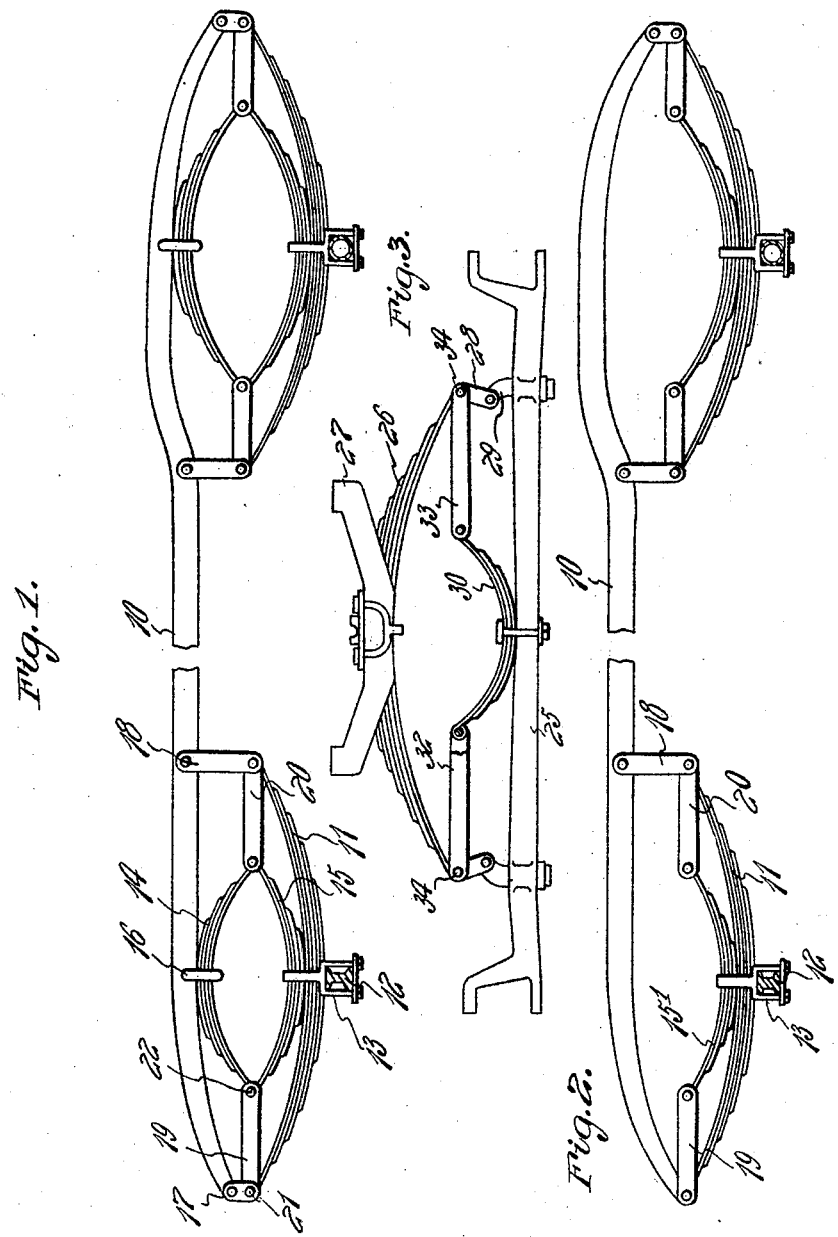
John B. Vidach
INVENTOR
BY Victor J. Evans
ATTORNEY
WITNESS:

Patented Mar. 16, 1926.

1,576,692

UNITED STATES PATENT OFFICE.

JOHN BAPTIST VIDACH, OF CHICAGO, ILLINOIS.

SPRING.

Application filed September 26, 1923, Serial No. 664,974. Renewed January 11, 1926.

*To all whom it may concern:*

Be it known that I, JOHN BAPTIST VIDACH, a citizen of the United States, residing at Chicago, in the county of Cook and State of Illinois, have invented new and useful Improvements in Springs, of which the following is a specification.

The object of this invention is to provide an improved spring designed especially for use in mounting the body of a motor car.

A further object is to provide, in connection with a principal spring, an inner supplemental spring or springs, the elements being mounted in the particular manner hereinafter disclosed.

A still further object is to provide an inner leaf spring comprising upper and lower elements adapted for mounting within the principal spring, and having connection with the ends thereof, and with the frame of the car.

With the foregoing and other objects in view, the invention consists in the novel construction and arrangement of elements described, illustrated and claimed, it being understood that modifications may be made within the scope of the claims without departing from the spirit of the invention.

In the drawings, Figure 1 is a view in side elevation showing the mounting of a plurality of leaf springs between a frame element and the front and rear axles; Figure 2 is a side elevation showing a modified arrangement; Figure 3 is a view in front elevation, showing the use of the springs on another type of car.

A portion of the frame of a motor car is designated 10, and an inverted leaf spring 11 is secured to the axle 12 by bolts or U-bolts 13.

Within this spring 11 are a plurality of leaf springs 14, 15, mounted in reverse relation, the lower spring 15 having its central portion secured to the axle and to spring 11, and the upper element 14 being secured at 16 to the frame 10.

Shackles 17 and 18 are connected with the frame and with the ends of the principal spring 11, while links or shackles 19, 20 extend from the bolts or pins 21 to similar elements 22, and connect corresponding ends of the several springs.

This construction makes it possible to employ three leaf springs in approximately the same space as would ordinarily be provided for one spring, and unusually effective cushioning means are provided.

In the modification disclosed in Figure 2, a single inner spring 15' is employed, the other connections remaining as before, and the parts being proportioned to produce an effect similar to that produced in the primary form.

In Figure 3 the front axle of a Ford car is designated 25, and the principal spring 26 is connected with the forward frame element 27 in the usual manner, and is further connected with shackles 28 and perches 29. A supplemental spring 30 is bolted to the axle, at 31, and is connected by links 32, 33, with pins or bolts 34 passing through the ends of spring 26. In each form of the construction an intermediate spring or springs produce similar results, the arrangement depending upon the conditions existing and the degree of resiliency desired.

What I claim is:

1. The combination with a curved leaf spring and means for connecting the spring with a vehicle axle, of a second and relatively short leaf spring of a greater degree of curvature mounted intermediate of the ends of the spring first named and connected with the axle, shackles for connecting the spring first named with the vehicle frame, and links connecting the shackles with the ends of the second spring and normally extending in substantial alinement with each other and with the chords of the springs specified.

2. The combination with a leaf spring and means for connecting the spring with a vehicle axle, of means for connecting the ends of the spring with the frame of the vehicle, a plurality of relatively short springs reversely arranged with respect to direction of curvature and mounted intermediate of the ends of the spring first named, devices connecting adjacent ends of all of the springs, the combined length of one of the short springs and the links being equivalent to that of the spring first mentioned, and said links permitting the springs to flex together without relative longitudinal movement, and means connecting one of the intermediate springs with the frame.

In testimony whereof I affix my signature.

JOHN BAPTIST VIDACH.